Sept. 8, 1959   R. S. KNAPP   2,903,249
TIMER-SWITCH FOR MIXER STAND
Filed June 20, 1955   2 Sheets-Sheet 1

Inventor
Robert S. Knapp
by Bair, Freeman & Molinare
Attorneys

Sept. 8, 1959 R. S. KNAPP 2,903,249
TIMER-SWITCH FOR MIXER STAND
Filed June 20, 1955 2 Sheets-Sheet 2
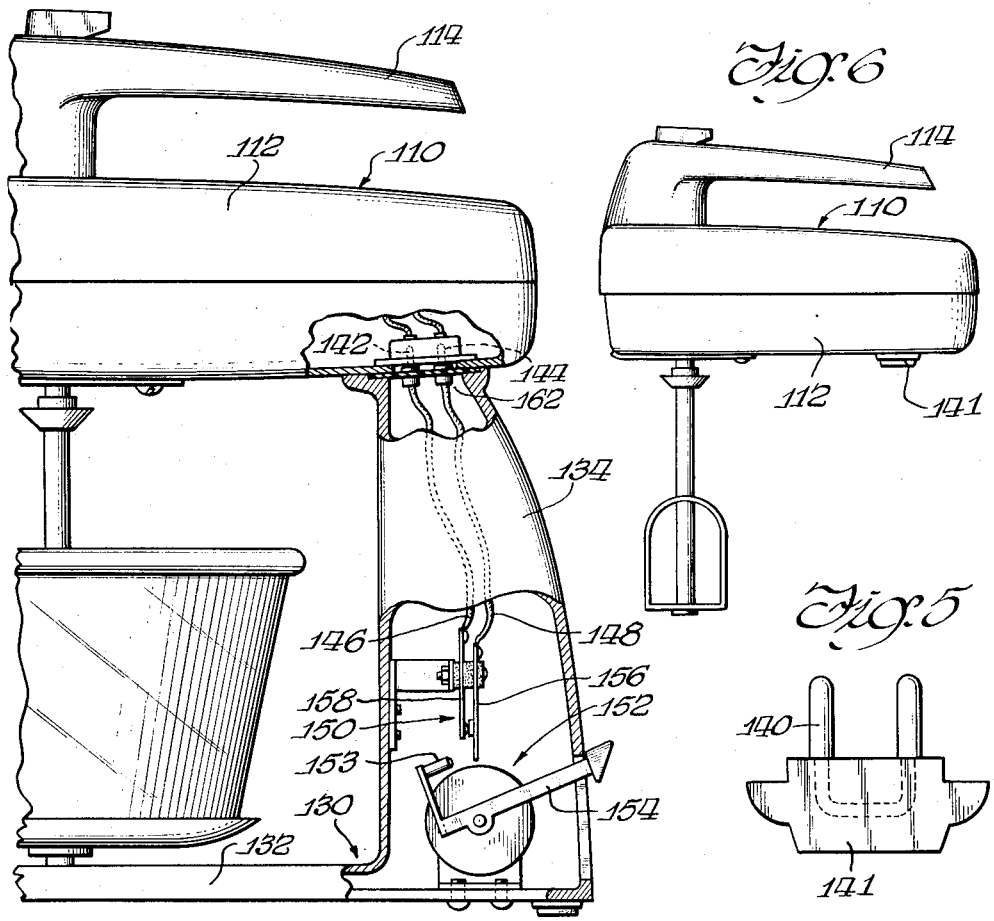
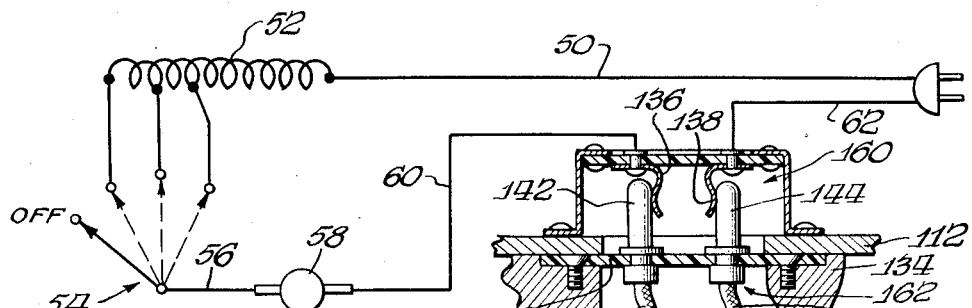
Inventor
Robert S. Knapp
by Bair, Freeman & Molinare
Attorneys

United States Patent Office 2,903,249
Patented Sept. 8, 1959

2,903,249

TIMER-SWITCH FOR MIXER STAND

Robert S. Knapp, St. Louis, Mo., assignor to Knapp-Monarch Company, St. Louis, Mo., a corporation of Delaware Application June 20, 1955, Serial No. 516,665

7 Claims. (Cl. 259—108)

This invention relates to a mixing apparatus and more particularly to a timed mixing apparatus for operating during a pre-selected time interval.

One object of this invention is to provide a mixing appliance that incorporates a timer therein so that the mixing may be set to take place during a preselected time interval, and whereby the mixer will shut off automatically after lapse of said time interval, without the necessity of attending to or watching the mixing appliance.

Another object of this invention is to provide a simple modification of existing mixing appliances which permits of use of said mixing appliance either as an ordinary manually controlled mixing appliance or as a timed mixing appliance as desired by the operator.

Still another object of this invention is to provide an electric mixer and mixer-stand combination which permits of use of the mixer by itself as a manually controlled mixer, without the stand, or as a timed mixing appliance when the mixer is mounted on the support stand therefor.

Still a further object of this invention is to provide a timed mixing appliance which is characterized by its simplicity and inexpensiveness of construction and by its efficiency and reliability of operation.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

Figure 3 is a fragmentary side elevation view showing a modified form of a timer switch control for a mixer;

Figure 4 is a view similar to Figure 2 showing in enlarged detail the connection between the mixer and the support stand therefor in the modified form of construction shown in Figure 3;

Figure 5 is a view of the removable electric bridge which is adapted for use with the mixer of the type disclosed in Figures 3 and 4; and Figure 6 shows the mixer of Figure 3 when being used as a hand mixer and removed from the support stand therefor.

Figure 1:
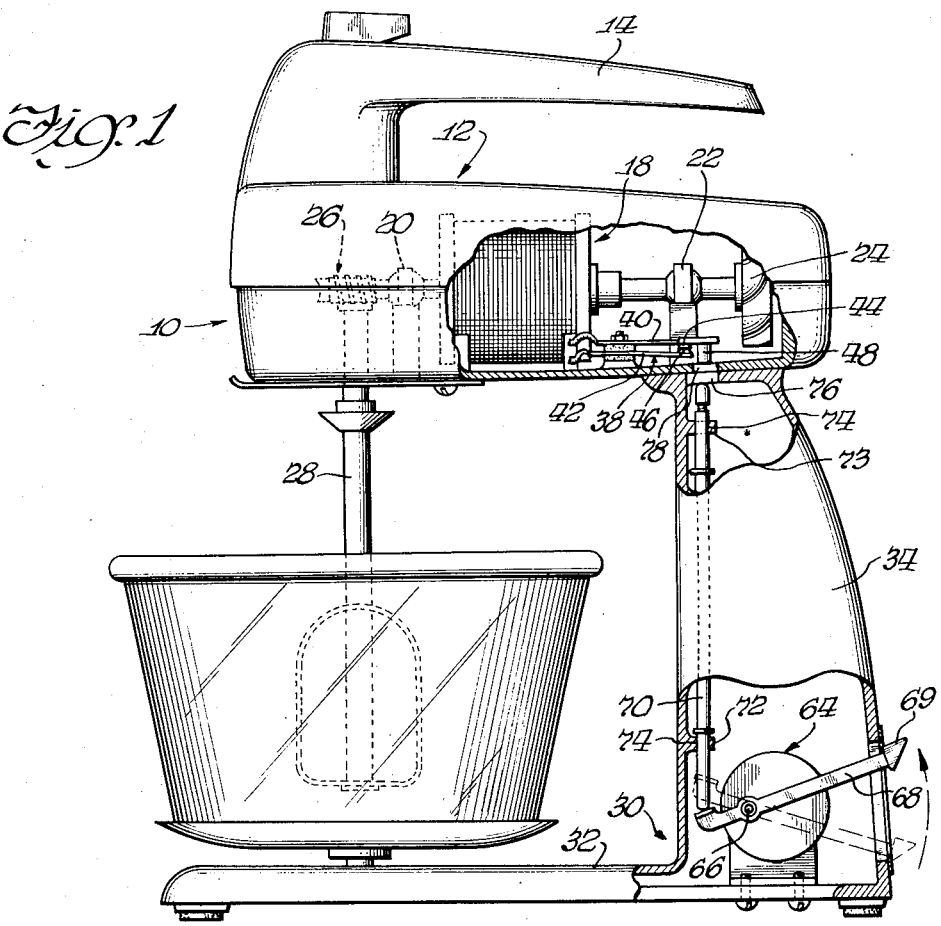
Figure 1 is an elevational view, partly in section and with parts broken away, showing the combination of a hand mixer mounted on a support stand, and which combination is provided with the timed control switch of this invention.

Referring now to the drawings there is shown in Figure 1 a hand mixer generally indicated at 10, which includes a casing 12 and a support handle 14 therefor. The mixer is of typical construction having a split casing secured together by a plurality of threaded bolts (not shown). Within the casing is a motor 18 which is appropriately supported in bearings 20 and 22 and which is cooled by means of a fan 24 mounted on the rotor shaft of the motor. The motor is appropriately connected through gearing means 26 so as to provide drive means for beaters 28 which may be removably secured to the housing 12. These details of the mixer are of generally well known construction and do not form part of this invention.

The mixer is adapted to be removably supported on an attachment means, or a support stand, generally indicated at 30, having a base member 32 and an upright support 34 extending upwardly from the base 32. The details of the removable connection between the mixer and attachment means are well known and are not specifically disclosed herein. Preferably, the upright support 34 is hollow.

In the invention herein, the energizing circuit for the mixer motor is provided with a normally closed switch generally indicated at 38 which is adapted to be opened in a manner as hereinafter described. The normally closed switch includes a pair of electrically conductive spring blades 40 and 42 which respectively carry contacts 44 and 46. The spring blade 40, in addition, carries an insulating projection, or embossment, 48 which is adapted to be engaged by a push rod for moving the blade 40 away from blade 42, so as to separate the contacts 44 and 46 and thereby open the energizing circuit for the motor.

Figure 2:
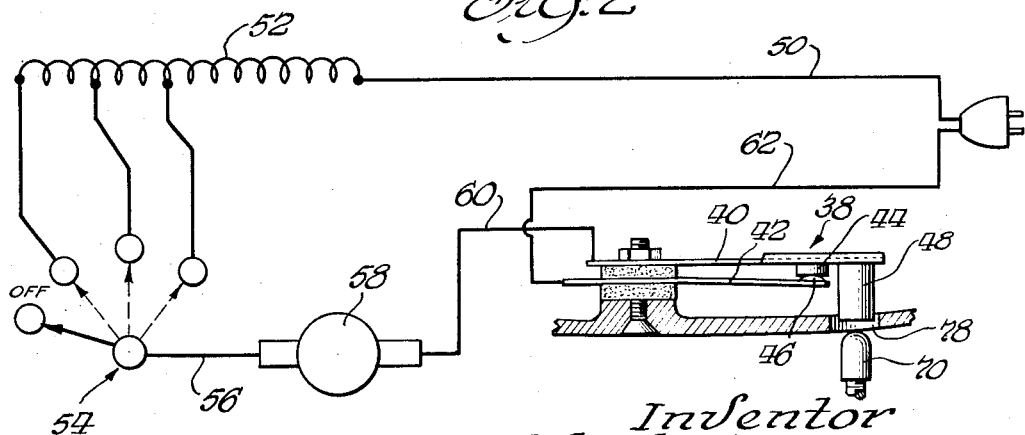
Figure 2 is a combination view showing the wiring diagram of the mixer of Figure 1, and also showing, in cross section, an enlarged detail view of the relationship of the push rod to the switch mechanism in the mixer.

As shown in the wiring diagram in Figure 2, the energizing circuit includes, in series, lead 50, an energizing field winding 52 for the mixer's motor, a movable selector switch 54, which is adapted to control the speed of the motor for three speeds as shown diagrammatically by the three selected positions for switch 54, lead 56, motor rotor 58, lead 60, blade 40, contact 44, contact 46, blade 42 and lead 62.

In order to operate the control switch mechanism, the stand 30 has mounted thereon, preferably within hollow upright support 34, a timer means 64 which includes a pivotable shaft 66 extending therefrom, upon which a control arm 68 is mounted intermediate the ends of said control arm. A portion of the control arm 68 extends outwardly of upright support 34 and has a knob 69 thereon. When the knob 69 of the control arm 68 is swung upwardly from its normal, original position, as shown in dashed lines in Figure 1, to, or toward, the full line position in Figure 1, the connection of the control arm 68 to the timer means 64 operates to potentialize, or effect winding of, the clock works within timer means 64, and after arm 68 is released, the clock works unwinds and operates to move arm 68 back at a timed rate towards its original, or normal, position. The amount of movement of arm 68 in winding the clock works in timer 14 determines the time interval through which the clock works will, thereafter, unwind. After the preset time interval has elapsed, and upon the control arm being moved back to its original position, the control arm is operable to engage a control rod 70, and lift the control rod 70 into engagement with the insulating projection 48 carried by the switch blade 40, thereby opening the switch and de-energizing the circuit for the mixer's motor.

The control rod 70 is carried within the hollow upright support 34 and is maintained in position for vertical reciprocal motion by means of spaced flanges 72 and 73 each having an aperture 74 therethrough through which a portion of the control rod 70 passes. The upright support 34 is provided with a recess, or aperture, 76 which registers with recess, or aperture, 78 in mixer casing 12, when the mixer 10 is connected to the support stand 30, to provide access for control rod 70 to the projection 48 which is aligned with aperture 78 in the mixer casing.

The form of the invention covered in Figures 1 and 2 includes one mechanical means for controlling the timer switch. An alternate means for controlling the timed operation of the mixer is shown in Figures 3 to 5 inclusive. In these figures, the mixer is shown at 110, including the casing 112 and the handle 114. The support stand is shown at 130 including the base 132 and the hollow upright support 134.

The mixer carries, in the energizing circuit therefor, a pair of spaced contacts 136 and 138 which are normally bridged, or short circuited, by a removable conductor, insert member, 140 carried in an insulating handle 141, when the mixer is used, by itself, as a manually controlled mixer. In mounting the mixer 110 on the support stand, the bridging element 140, which is normally maintained in proper position by frictional connection between handle 141 and casing 112, is removed and the contacts 136 and 138 respectively engage contacts 142 and 144 which are permanently carried by the support stand 134 on a plate 143, provided therefor. These latter contacts 142 and 144 are connected respectively by leads 146 and 148 to a normally closed switch, generally indicated at 150, which is adapted to be opened by some appropriate means, such as by a switch opener means actuated by a timer mechanism 152. The timer mechanism 152 is of the variety heretofore described, and includes a pivotable arm 154 which is restored from a displaced position at a predetermined rate and over a preset period of time. Upon return of the control arm 154 to its original position, a switch opener means, shown specifically as an insulator 153, appropriately attached to the arm 154 is operable to engage and spread apart the normally closed spring blades 156 and 158 of the switch 150, to thereby interrupt the circuit through the motor of the mixer.

In Figure 4, parts of the wiring diagram similar to parts shown in Figure 2 are numbered similarly. In the modified form of Figures 3–5, proper connection between the mixer and support stand occurs when the recess, generally indicated at 160, in the mixer casing 112, within which is located the contacts 136—138, is aligned with the recess 162 in upright support 134, within which is positioned the contacts 142—144.

Thus from the above description, it can be seen that there is provided a timed mixer wherein the mixer can be maintained on its support and a timed interval can be set during which the mixer operates and at the end of which time the mechanism is operative to automatically shut off the operation of the mixer. Also, the mixer may be removed from the support stand therefor and the energizing circuit for the mixer can be then properly conditioned to operate normally without any time control therefor. In the species of Figures 1 and 2, the energizing circuit is automatically conditioned for operation, since the blades 40 and 42 are normally biased to the circuit closing condition, while in the species of Figures 3 to 5, it is necessary to bridge the contacts 136 and 138 with the bridging element 140 as shown in Figure 5. However, once bridged, the energizing circuit of the mixer is, at that point, always closed and the mixer may then be used as a manually controlled mixer, as shown in Figure 6, without any time control thereof.

The support stand may be provided with a suitable scale calibrated to the various positions assumed by the control arm, 68 or 154, for designating the time that has been preset on the clock works of the timing mechanism.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A timing mixer comprising, in combination, a support including a base adapted to have a bowl mounted thereon, and a hollow upright extending upwardly from said base; an electrically energized mixer including a hollow mixer housing separably mounted on said upright, said mixer having an energizing circuit including a normally closed switch therein, said normally closed switch being disposed within one of said hollow upright and hollow mixer housing; a timer mounted within said hollow upright and having a manually operable timer-setting control member extending outwardly of said hollow upright and adapted for setting the length of time that the mixer is to operate, and movable actuating means within said hollow upright and operatively connecting said timer and said normally closed switch and being operative to open said normally closed switch upon the timer reaching the end of the time period during which the mixer is to be operated.

2. A timing mixer comprising, in combination, a support including a base adapted to have a bowl mounted thereon, and an upright extending upwardly from said base; an electrically energized mixer separably mounted on said upright, said mixer having an energizing circuit including a normally closed switch therein; a timer mounted on said support, a push rod carried in said upright and being positioned for operative association with said timer and with said normally closed switch, a pivotly mounted elongated timer control-arm pivoted on an axis located intermediate the ends of said control arm, one end of said control arm extending outwardly of said support and serving as a timer-setting control member which is adapted to set the timer for the length of time the mixer is to operate, and the other end of said control arm being adapted to engage and actuate said push rod to open said normally closed switch.

3. A timing mixer comprising, in combination, a support including a base adapted to have a bowl mounted thereon, and a hollow upright extending upwardly from said base; an electrically energized mixer including a hollow mixer housing separably mounted on said upright, said mixer having an energizing circuit including a normally closed switch therein, said normally closed switch being disposed within one of said hollow upright and hollow mixer housing; switch actuating means carried in said hollow upright and being operatively associated with said switch and adapted, when actuated, to open said switch, a pivotly mounted timer-setting control means mounted on said support and adapted to be swung into actuating engagement with said switch actuating means for opening said switch, potentializable timer means operatively associated with said pivotly mounted timer-setting control means and adapted to be potentialized to a selected timing interval by pivoting of said timer-setting control means a selected distance in one direction, and said potentialized timer means being operative to pivot said timer-setting control means over said selected distance in the opposite direction during said selected time interval, so as to move said timer-setting control means into actuating engagement with said switch actuating means for opening said switch.

4. A timing mixer comprising, in combination, a support including a base adapted to have a bowl mounted thereon, and an upright extending upwardly from said base; an electrically energized mixer separably mounted on said upright, said mixer having an energizing circuit including a normally closed switch therein, a timer mounted on said support and having a stem extending therefrom which when pivoted in one direction operates to initiate the timing of a selected period, said stem being pivotable back towards its original position at a timed rate, an elongated control arm mounted on said stem at a point intermediate the ends of said control arm and adapted to be pivoted with said stem, a push rod carried in said upright and being positioned for operative association with said timer and with said normally closed switch, one end of said control arm extending outwardly of said support and serving as said timer-setting control member, the other end of said control arm being operative to engage and actuate said push rod to open said normally closed switch.

5. In an electric mixer wherein the mixer is removably mounted on a support therefor; the improvement comprising, in combination, a hollow housing for said mixer, a hollow support for said mixer housing, a normally closed switch in the energizing circuit for the mixer, said normally closed switch being disposed within one of said hollow housing and hollow support; selectively settable timing means carried by said support; and movable actuating means carried within said hollow support and operatively associated with said timing means and said normally closed switch and being operative to open said normally closed switch upon the timer reaching the end of the time period during which the mixer is to be operated.

6. An electric mixer as set forth in claim 5, wherein said normally closed switch is located within the hollow mixer housing.

7. An electric mixer as set forth in claim 5, wherein said normally closed switch is located within said hollow support.

References Cited in the file of this patent
UNITED STATES PATENTS

| | | |
|---|---|---|
| 1,230,826 | Campbell | June 19, 1917 |
| 2,203,672 | Chester | June 11, 1940 |
| 2,469,932 | Ritter | May 10, 1949 |
| 2,550,281 | Martin | Apr. 24, 1951 |
| 2,671,191 | Braski | Mar. 2, 1954 |
| 2,685,625 | Holstein | Aug. 3, 1954 |
| 2,789,798 | Brace | Apr. 23, 1957 |